Jan. 3, 1950 V. C. STERRETT 2,493,602
PRESSURE FLUID MOTOR
Filed Dec. 31, 1947 2 Sheets-Sheet 1
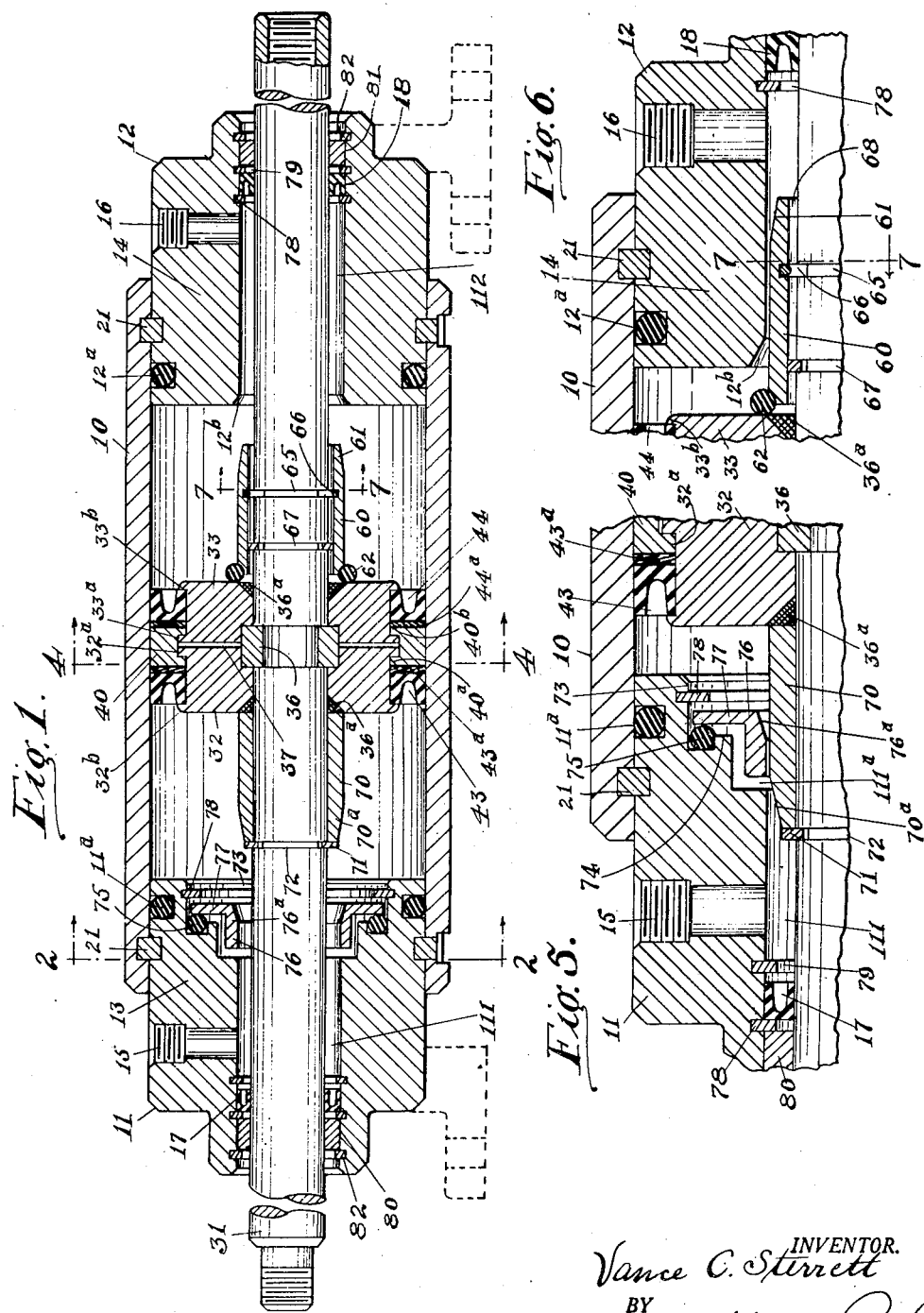
INVENTOR.
Vance C. Sterrett
BY
Munn, Liddy, Glaccum & Rich
Attys.

Jan. 3, 1950 V. C. STERRETT 2,493,602
PRESSURE FLUID MOTOR
Filed Dec. 31, 1947 2 Sheets-Sheet 2
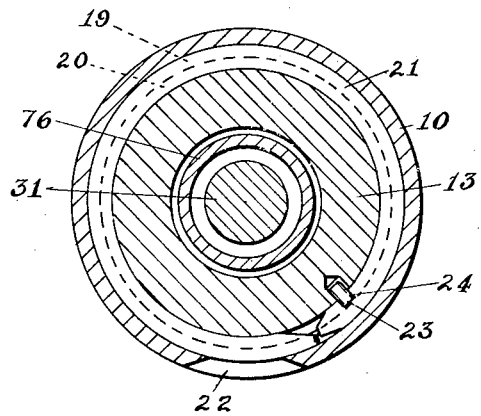
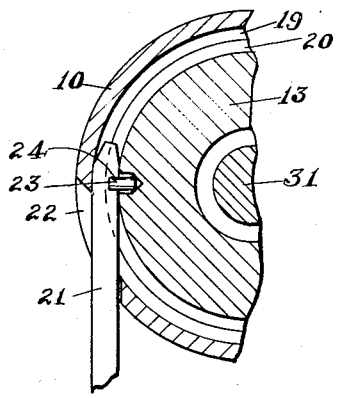
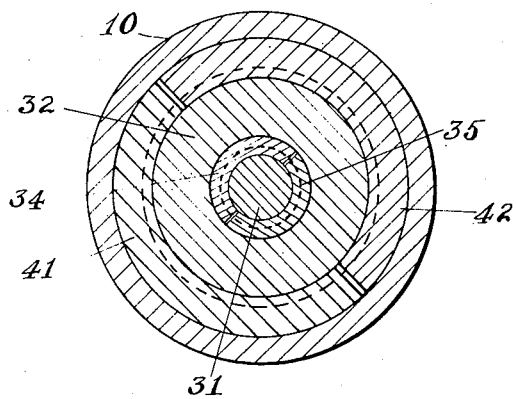
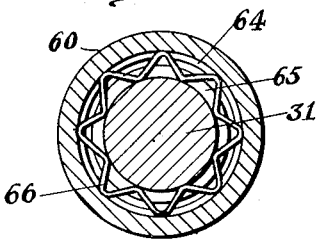
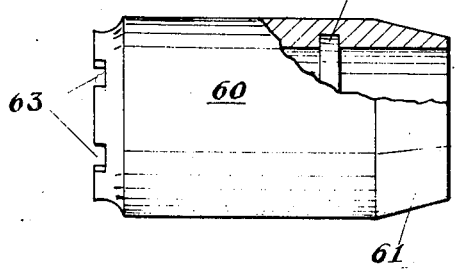
INVENTOR
Vance C. Sterrett
BY Patented Jan. 3, 1950

2,493,602

UNITED STATES PATENT OFFICE 2,493,602

PRESSURE FLUID MOTOR

Vance C. Sterrett, Logansport, Ind.

Application December 31, 1947, Serial No. 794,975

13 Claims. (Cl. 121—38)

1

My present invention has for its object to provide a power cylinder construction with an interior piston and automatic valve mechanism controlling its reciprocatory travel for cushioning the movement of the parts at the end of the piston stroke, thereby eliminating a damaging impact within the cylinder.

Another object of my invention resides in the means employed for internally connecting the cylinder heads within the ends of the cylinder whereby the cross sectional size of the instrument is determined by the external diameter of the cylinder thus enabling such device designed for delivering a given power output to be compactly constructed and rendered capable of use in confined spaces in conjunction with various types of machines on which the power apparatus may be employed.

In connection with this type of apparatus my invention also comprises a novel means of constructing the piston and connecting it to its rod and mounting on its periphery a suitable wear ring and packing rings which cooperate with the inner wall of the cylinder.

The reciprocatory movement caused by fluid pressure acting upon the piston in the cylinder may be controlled to render the device either single or double acting and the end of the power stroke is cushioned by my improved valve mechanism which operates automatically as the piston approaches the end of its power stroke by restricting the outflow of fluid in the cylinder ahead of the piston, said valve construction being such that it likewise automatically allows reentrance of fluid into the cylinder to permit reciprocation of the piston in the opposite direction. A feature of this valve mechanism which I have devised comprises a sleeve carried on the piston shaft separate from the piston and entering a recess in the cylinder head and cooperating passages either in the sleeve or head with means for alternately controlling egress and ingress of fluid supplied under pressure to the recesses in the cylinder heads.

To these and other ends my invention comprises further improvements and advantages as will be further described in the accompanying specification, the novel features thereof being set forth in the appended claims.

In the drawings:

Figure 1 is a central longitudinal cross section of a power force cylinder embodying my invention.

Figure 2 is a vertical cross section taken on the line 2—2 of Fig. 1 showing the means I employ

2 for locking the cylinder heads within the ends of the cylinder.

Figure 3 is a similar view showing the manner in which the locking key is applied.

Figure 4 is a vertical cross section taken on the line 4—4 of Fig. 1 illustrating the construction and arrangement of the locking rings which secure the piston sections to its shaft end to each other.

Figure 5 is an enlarged cross sectional view of the valve mechanism illustrated at the left hand end of Fig. 1 with the piston shown in position with its cushioning sleeve in operating position as the piston approaches the limit of its movement toward the piston head on the left hand end of the cylinder.

Figure 6 is an enlarged cross sectional view of the valve mechanism illustrated at the right hand end of Fig. 1 with the piston shown in position with its sleeve in operating position as the piston approaches the limit of its movement toward the piston head on the right hand end of the cylinder.

Figure 7 is an enlarged cross sectional view taken on the line 7—7 of Figs. 1 and 6 showing a locking means which I employ for securing sleeve portions of the mechanism.

Figure 8 is a detail view showing the sleeve depicted in Fig. 6.

Similar reference numerals, in the several figures, indicate similar parts.

In carrying out my invention the fluid power unit comprises a hydraulic cylinder 10 of an internal diameter suitable to the ultimate power to be delivered and of a length selected according to the nature of the work to be performed by the enclosed piston and piston rod. The ends of the cylinder are closed by the opposed heads 11 and 12 having inner or proximate ends 13 and 14 which fit closely within the ends of the cylinder, their remaining or outer portions being of such dimensions as to accommodate fluid inlet or outlet ports 15 and 16 and take piston rod packing glands 17 and 18 located outwardly beyond said ports. As is common practice in the operation of hydraulic cylinders the source of fluid pressure be it oil, water or air is connected through a four way control valve to the ports 15 and 16 so that it may alternately be introduced at the one end of the cylinder to act on one side of the piston and allowed to exhaust from the opposite side of the piston. Since this master valve is well known in the art I have omitted illustration thereof.

The union between the heads and the cylinder is effected by providing the respective overlapping parts with mating annular recesses, of suitable depths, as indicated by 19 and 20 in Fig. 3 which accommodate a locking strip 21. The latter is preferably rectangular in cross section and capable of withstanding a shear strain in excess of any internal pressure that may be applied to a given cylinder. To facilitate the application of the locking strip 21 there is provided an opening 22 in the wall of the cylinder leading from its recess 19 and at a point in the bottom of the recess 20 in the head there is a drilled hole for the recepttion of a pin 23. The outer end of the latter is approximately equal to the depth of recess 20 and extending across the inner end of the locking strip is a recess 24 by means of which the strip is hooked in engagement with the pin when its forward end is inserted in the opening 22. From this arrangement of parts it will be seen that by effecting a relative rotation of the cylinder and a cylinder head the locking strip will be drawn inwardly, as shown in Fig. 2 to effect a complete encirclement of the head to securely unite it to the end of the cylinder without the use of any other means of attaching the parts.

In the inner ends 13—14 of the two heads I provide annular channels and insert therein rubber rings 11$^a$ and 12$^a$. The cross sectional diameter of these is such that they are normally compressed against the cylinder wall when the heads are inserted.

The piston rod 31 extends through the heads 11 and 12 axially of the cylinder 10 and centrally mounted thereon is the piston the construction of which end the means for holding it rigidly connected to the rod comprises an important part of my invention. As shown in Fig. 1 the piston comprises two similar right and left hand disc shaped parts 32, 33 bored centrally to receive the rod and of a diameter somewhat less than that of the cylinder. On the shaft between the meeting faces of the two discs forming the piston is an annular groove and fitted therein are two semi-circular sections 34, 35 (Fig. 4) which form a shear ring 36 (Figs. 1, 5 and 6). One half of the thickness of the ring extends beyond the face of the rod 31 and is received in and held in place on the shaft by recesses formed in the adjacent faces of the piston discs, which are also formed to accommodate packing rings 36$^a$ which are triangular in cross section. In lateral depth the last mentioned recesses are slightly less than one half the width of the shear ring 36 for the purpose of holding the faces of the disc apart sufficiently and provide a space 37 to allow for inaccuracies of machining.

The peripheries of the piston discs are each recessed to provide them with annular flanges 32$^a$, 33$^a$ on their adjacent edges and similar flanges 32$^b$, 33$^b$ on their outer edges. Surrounding the piston and snugly fitting the space between it and the cylinder wall with a sliding fit therein is a wear ring 40 (Figs. 1, 5) composed of two parts 41, 42 (Fig. 4) which are recessed on their inner faces to provide lateral annular shoulders 40$^a$, 40$^b$ which straddle the central piston flanges 32$^a$, 33$^a$. Also carried on the circumference of the piston discs are piston packing rings 43, 44. These are cup shaped in cross section. They face in opposite directions and are backed against shims 43$^a$, 44$^a$ lying at the opposite sides of the central wear ring 40 and held in this position by the outer flanges 32$^b$, 33$^b$ on the piston discs. These shims serve to close the spaces between the meeting ends of the semi-circular portions of ring 40. They are cut circularly to size from thin metal and to permit their application in place are severed at one place on a diagonal line.

The means for cushioning the movement of the piston as it approaches the limits of its travel in opposite directions comprises sleeves carried on the piston rod 31 which are projected into corresponding annular recesses 111—112 of the two cylinder heads 11 and 12, and in cooperation therewith constitute control valve mechanisms.

In Fig. 1, I have shown two such valve mechanisms of slightly different construction which may be used conjointly or separately but which have certain common characteristics in that parts of them are capable of yielding laterally with reference to the axis of the cylinder and thus possess the advantage of eliminating close tolerances in machining the parts.

The valve mechanism shown at the right hand side of Fig. 1 is preferable in that it comprises fewer parts and is therefore simpler in construction. It comprises a sleeve 60 having an internal diameter slightly greater than that of shaft 31. It has a beveled forward end 61 for cooperation with the beveled entrance 12$^b$ of the central recess 112 of head 12 and at its rear end carries a rubber ring 62 of circular cross section seated in a correspondingly shaped shallow recess in the sleeve in which it is retained by its elasticity. The rear edge of the sleeve may rest against the piston disc 33 in which event it is provided with a series of cutouts or notches 63 (Fig. 8) but these may be omitted by arranging the locking device which holds the sleeve on the shaft to provide a slight space between the sleeve and piston. Near its forward end sleeve 60 contains on its inner wall a circular recess 64, located in the same vertical plane as an annular recess 65 on the shaft, said two recesses being provided for the reception of a novel form of locking ring for holding the sleeve against the piston and insuring its movement with the piston rod. This ring is shown in detail in Fig. 7 and comprises a serpentine wire 66 the points of which engage in both of said recesses and serve to space the sleeve conveniently on the shaft. A similar ring lies in a recess 67 in the shaft adjacent the rear end of the sleeve. It will be seen that as the alternate points of the sepentine wire rings engage the sleeve and piston that the sleeve is held nearly concentric on the shaft and also as the points on the ring are capable of yielding the sleeve as it enters the recess 112 will automatically adjust itself transversely therein. This is important because of the generally close fitting of the parts in the first instance and later when the gland packings may become worn and allow the axis of the shaft to shift slightly relatively to its initial axial position in the cylinder heads.

In the above described construction it will be observed that as the piston moves in a direction toward the right that as the tapered end of the sleeve enters the channel 112 it acts as a valve to restrict the outflow of the fluid ahead of the piston causing the remaining fluid to be partly compressed and thus act as a cushion, the effect of the latter increasing until the piston reaches a position of rest due to the increasing depth of penetration of the sleeve into passage 112.

It is understood that entrance of fluid under pressure to and its exhaust from alternate ends of the cylinder 10 is controlled by a suitable four way valve mechanism, hence when fluid pressure is introduced to the cylinder through the port 16, to reverse the movement of the piston, it enters initially through the passage 68 within sleeve 60 and enters the cylinder through the notches 63 dislodging the packing ring 62 from engagement with piston disc 33.

In the alternate form of the cushioning control valve shown at the left hand end (Fig. 1) the sleeve 70 closely surrounds the rod 31 and is held in engagement with the piston disc 32 by a snap ring 71, which engages its forward end and is carried in a recess 72 of the rod. At the inner end of the central recess 111 in the head 11 is provided with a stepped recess comprising an inner portion 111ª and an outer portion 73 of greater diameter forming a vertical shoulder 74 which latter has an annular recess in its face carrying a rubber packing ring 75. In the smaller intermediate recess 73 I locate a floating collar 76 carrying an annular flange or skirt 77. The latter overlies the wall 74 and its periphery is guided loosely by the wall of the larger recess 73 and when moved outwardly its face engages the packing ring 75. The collar 76 has an internal diameter in which the sleeve 70 has a sliding fit. Inasmuch as the collar "floats" in the stepped recess I provide for its being centered by sleeve 70 by providing the forward end of the sleeve and the adjacent edge of the opening in the collar with bevel surfaces 70ª and 76ª, respectively. In the larger recess 73, ahead of skirt 77 is a retaining snap ring 78 such as before described and illustrated in Fig. 7. Thus it will be seen that when the piston approaches the limit of its movement (in this case in a direction toward the left in Figs. 1 and 5) a cushioning action occurs as the sleeve 70 begins to enter collar 76 and increases as the remaining fluid ahead of the piston becomes compressed when its escape is thwarted by the engagement of the skirt 77 with the packing ring 75. In this instance movement of the piston toward the right on the succeeding stroke is permitted since fluid under pressure entering port 15 displaces the floating ring 76 inwardly on sleeve 70. This disengages the skirt 77 and a path for the ingress of fluid to the face of the piston exists around the edge of the skirt.

A detail to be mentioned in regard to the packing glands 17—18 is that snap rings 78—79 such as shown in Fig. 7, are provided both in front and rear of said glands. Outside of the latter the end portions of the shaft are carried by and journaled in journal rings 80—81 which back up the packings and are themselves held in place by snap rings 82, all of said rings being held in place by the engagement of their outer points in annular recesses formed in the walls of the recesses 111 and 112.

While each of the described forms of cushioning valves automatically accommodate themselves for any inexactness in axial alinement of the sleeves 60 and 70 with their receiving recesses 111—112 respectively, they also provide for ready admission of fluid under pressure to the end chambers of the cylinder thereby allowing immediate freedom for the piston to move out of juxtaposition with the cylinder head against which it was cushioned.

In dotted lines in Fig. 1, I have indicated examples of brackets which may be attached to or formed integral with the cylinder heads for use in mounting the unit in working position.

Herein I have disclosed a form of fluid power unit, adapted for operation either by pneumatic pressure or oil or water pressure, which operates smoothly without shock and which is also capable of delivering power whenever such is needed either by a push-pull movement double acting unit or as a single stroke device. Moreover its structure is unique in that I have eliminated the use of screws, nut or bolts in the assembly of the parts of my unit.

What I claim and desire to secure by Letters Patent is:

1. A fluid pressure actuator comprising a cylinder of given internal diameter, heads secured in the ends of the cylinder having axial passages and other passages communicating therewith for the ingress and egress of fluid to the outer ends of the axial passages, a piston rod guided in the axial passages, a piston carried by the rod, a sleeve of larger internal diameter than said rod to provide a fluid passageway therebetween, means preventing outward flow of fluid through said passageway, said sleeve being carried on the rod having an outside diameter fitting with slight clearance the axial passage of the head on the corresponding side of the piston and serving to restrict the outward flow of fluid from the cylinder as the piston approaches said head.

2. A fluid pressure actuator comprising a cylinder of given internal diameter, heads secured in the ends of the cylinder having axial passages and other passages communicating therewith for the ingress and egress of fluid to the outer ends of the axial passages, a piston rod guided in the axial passages, a piston carried by the rod, a sleeve surrounding the rod at one side of the piston said sleeve being of larger internal diameter than the rod to provide a fluid passageway therebetween, means at one end of the sleeve to permit unidirectional flow through said passageway, said sleeve having an external diameter to fit with slight clearance within the axial passage of the head as the piston approaches it, and means for connecting the sleeve to the rod and supporting it thereon.

3. A fluid pressure actuator comprising a cylinder of given internal diameter, heads secured in the ends of the cylinder having axial passages and other passages communicating therewith for the ingress and egress of fluid to the outer ends of the axial passages, a piston rod guided in the axial passages, a piston carried by the rod, a sleeve surrounding the rod adjacent the piston at one end and provided with a bevel at its other extremity, said sleeve having an external diameter to fit the axial passage of the proximate cylinder head and an internal diameter larger than that of the rod, the adjacent surfaces of said sleeve and its associated passage having a restricting clearance formed therebetween, a member within the sleeve serving to connect it to the rod and yieldingly support it on the rod.

4. A fluid pressure actuator comprising a cylinder of given internal diameter, heads secured in the ends of the cylinder having axial passages and other passages communicating therewith for the ingress and egress of fluid to the outer ends of the axial passages, a piston rod guided in the axial passages, a piston carried by the rod, a sleeve surrounding the rod adjacent the piston at one end and provided with a bevel at its other extremity, said sleeve having an external diameter to fit the axial passage of the proximate cylinder head and an internal diameter larger than that of the rod, the adjacent surfaces of said sleeve and its associated passage having a restricted clearance formed therebetween, said sleeve and rod being provided with interior and exterior registering annular recesses and a serpentine ring located in said recesses serving to space the sleeve around the rod and to lock it thereon.

5. A fluid pressure actuator comprising a cylinder of given internal diameter, heads secured in the ends of the cylinder having axial passages and other passages communicating therewith for the ingress and egress of fluid to the outer ends of the axial passages, a piston rod guided in the axial passages, a piston carried by the rod, a sleeve on the rod adjacent the piston at one end, a packing ring on said end yieldingly engaging the face of the piston, said sleeve having an external diameter to enter the axial passage of the proximate cylinder head and an internal diameter larger than that of the rod, the adjacent surfaces of said sleeve and its associated passage having a restricting clearance formed therebetween, and yielding members between the two ends of the sleeve and the rod for permitting its transverse movement relative to the rod, one of said members serving to lock the sleeve against independent longitudinal movement on the rod.

6. A fluid force actuator unit comprising a cylinder, heads thereon having passages for the inlet and outlet of fluid to the cylinder, a piston rod guided in the heads and a piston carried on the rod, at least of said heads having an axial recess embodying portions of different diameters in step down formation extending outwardly from the inner side of the head, the portion thereof of smallest diameter being the deepest and the other portions forming a shoulder between them, a floating collar in the intermediate portion of the recess having a skirting flange movable into and out of engagement with said shoulder, and a sleeve carried on the rod adapted as the piston moves toward the head to enter the collar and subsequently penetrate the deepest part of the recess to progressively restrict the outflow of fluid from cylinder ahead of the piston.

7. A fluid force actuator unit comprising a cylinder, heads thereon having passages for the inlet and outlet of fluid to the cylinder, a piston rod guided in the heads and a piston carried on the rod, one at least of said heads having an axial recess embodying portions of different diameters in step down formation extending outwardly from the inner side of the head, the portion thereof of smallest diameter being the deepest and the other portions forming a shoulder between them, a packing ring carried on the shoulder, a floating collar located in the intermediate step portion of the recess having a skirting flange movable into and out of engagement with the packing ring and a sleeve carried on the rod adapted as the piston moves toward the head to enter the collar and subsequently penetrate the deepest part of the recess to progressively restrict the outflow of fluid from the cylinder ahead of the piston.

8. A fluid pressure force director comprising a cylinder, heads securely attached thereto having axial passages and other passages communicating therewith for the ingress and egress of fluid to the outer end of the axial passages, a piston rod axially positioned and slidable relative to one or both heads, a piston assembly securely locked longitudinally to said piston rod, a sleeve of larger internal diameter than the piston rod to afford passage of the flow of the fluid inward to the cylinder as the piston assembly departs from said head, said sleeve being carried on the piston rod at at least one side of the piston assembly and adjacent the piston at one end, a packing ring on said end yieldingly engaging the face of the piston to permit said inward flow of fluid, said sleeve having an outside diameter fitting the axial passage of the head the adjacent surfaces of the sleeve and passage having a slight clearance therebetween serving to restrict the outward flow of the fluid from the cylinder as the piston assembly approaches the corresponding head.

9. A fluid pressure force director comprising a cylinder, heads securely attached thereto having axial passages and other passages communicating therewith for the ingress and egress of fluid to the outer end of the axial passages, a piston rod axially supported and bearing slidable relations with one or both heads, a piston assembly securely locked longitudinally to said piston rod, a sleeve surrounding the piston rod on at least one side of the piston assembly, said sleeve being of larger internal diameter than the piston rod diameter, the external diameter of said sleeve fitting with slight clearance within the axial passage of the head in its approach thereto, and means for connecting the sleeve to the piston rod and supporting said sleeve yieldingly thereabout and securing said sleeve longitudinally thereto.

10. A fluid pressure force director comprising a cylinder, heads securely attached thereto having axial passages and other passages communicating therewith for the ingress or egress of fluid to the outer ends of said passages, a piston rod guided axially in and slidable relative to one or both heads, a piston assembly secured longitudinally to the piston rod, a sleeve on the rod adjacent the piston assembly at at least one side, the external diameter of said sleeve fitting with slight clearance within the axial passage of the head in its approach thereto, said sleeve having an internal diameter larger than the diameter of the piston rod, yielding means between the sleeve and the piston rod for permitting limited transversal freedom to the sleeve relative to the piston rod and locking the two longitudinally, a peripheral groove at one end of said sleeve, a packing ring in said groove yieldingly engaging the face of the piston and circumventing the adjacent end of said sleeve, serving to check the egress of the flow of the fluid out from the cylinder and admitting of ingress of the flow of fluid to the cylinder.

11. A fluid pressure force director comprising a cylinder, heads securely attached thereto having axial passages and other passages communicating therewith for the ingress and egress of fluid to the outer end of said passages, a piston rod guided axially in and slidable relative to one or both heads, a piston assembly secured longitudinally to the piston rod, a sleeve on the piston rod positioned on at least one side of the piston assembly having an external diameter fitting the passage in the head with slight clearance serving to restrict the egress of the fluid from the cylinder as the piston assembly approaches near the corresponding head, said sleeve having an internal diameter larger than the diameter of the piston rod, serving as an internal passage for the ingress of the fluid to the cylinder as the piston assembly departs from near the head, means for yieldingly attaching said sleeve to the piston rod to provide transverse freedom of the sleeve relative to the piston rod and to provide longitudinal carriage of the sleeve by the piston rod, a peripheral groove at one end of said sleeve, a sealing ring yieldingly engaging the face of the piston assembly and circumventing the proximate end of said sleeve in said groove serving to restrict the egress of the fluid from the cylinder and admit of ingress of the fluid to the cylinder from the internal passage.

12. A fluid pressure force director unit comprising a cylinder, heads hermetically sealed therewith and securely attached thereto having axial passages and other passages communicating therewith for the ingress and egress of fluid to the outer end of said axial passages, a piston rod axially guided by and slidable relative to at least one of said heads and hermetically sealed therewith, a piston assembly attached to said piston rod, at least one of said heads having a face recess therein, a collar confined loosely in said recess to afford floating transverse and longitudinal freedom to said collar within the limits of the recess, said recess having an annular groove in the bottom face thereof, a sealing ring in said groove, said floating collar having an outwardly extending annular flange contacting the annular sealing ring, a sleeve securely attached to the piston rod on at least one side of said piston assembly having an outside diameter telescopically fitting with slight clearance an internal diameter provided in the floating collar serving together with the sealing ring to restrict the egress of the fluid from the cylinder as the piston assembly approaches near such head, said freely floating collar permitting transverse self-adjustment to eccentricities of the sleeve and longitudinal disengagement of the collar with the sealing ring to admit ingress of fluid to the cylinder throughout the existence of the telescopic relation between the collar and the sleeve.

13. A fluid pressure force director unit comprising a cylinder, heads hermetically sealed therewith and securely attached thereto having axial passages and other passages communicating thereto for the ingress and egress of fluid to the outer ends of said axial passages, a piston rod axially guided by and slidable relative to at least one of said heads and hermetically sealed therewith, a piston assembly attached to said piston rod, at least one of said heads having a face recess therein, a collar confined loosely in said recess to afford floating transverse and longitudinal freedom to said collar within the limits of the recess, a second recess adjacent said first recess and forming therebetween an annular face step, said floating collar having an outwardly extending annular flange serving to contact said annular face step, a sleeve securely attached to the piston rod on at least one side of the piston assembly having an outside diameter telescopically fitting with slight clearance an internal diameter provided in the floating collar serving together with said annular face step and said annular collar flange to restrict the egress of the fluid from the cylinder as the piston assembly approaches near such head, such freely floating collar permitting transverse self-adjustment to eccentricities of the sleeve, and longitudinal disengagement of the collar with the annular face step to admit ingress of fluid to the cylinder throughout the existence of the telescopic relation between said collar and said sleeve as the piston assembly moves away from said head.

VANCE C. STERRETT

REFERENCES CITED

The following references are of record in the file of this patent:

UNITED STATES PATENTS

| Number | Name | Date |
| --- | --- | --- |
| 531,792 | Forslund | Jan. 1, 1895 |
| 559,526 | Heermans | May 5, 1896 |
| 845,827 | Steedman | Mar. 5, 1907 |
| 2,336,240 | Gavin | Dec. 7, 1943 |
| 2,403,020 | Parsons | July 2, 1946 |
| 2,443,312 | Geiger | June 15, 1948 |